No. 612,191. Patented Oct. 11, 1898.
J. T. CASE.
ROTARY ENGINE.
(Application filed May 19, 1897.)
(No Model.) 4 Sheets—Sheet 1.

Witnesses

Inventor
Joel T. Case
By James Shepard
Atty.

No. 612,191. Patented Oct. 11, 1898.
J. T. CASE.
ROTARY ENGINE.
(Application filed May 19, 1897.)
(No Model.) 4 Sheets—Sheet 2.
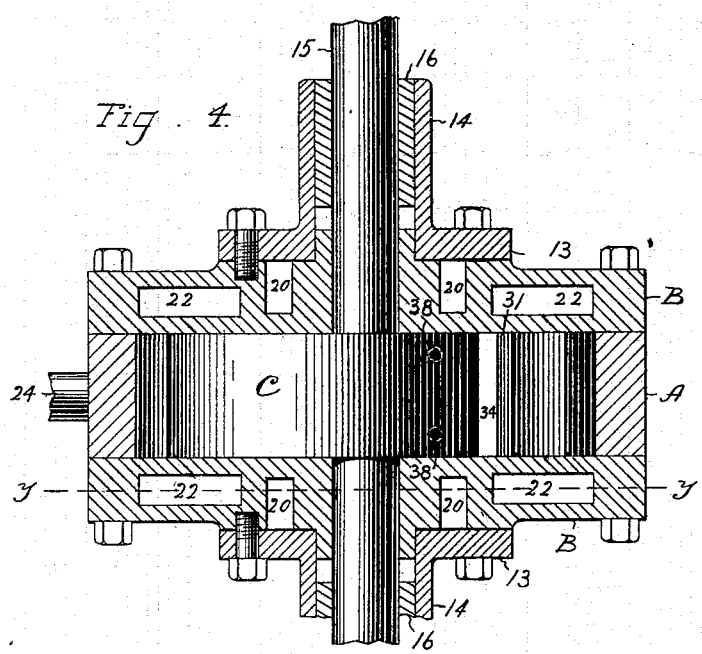
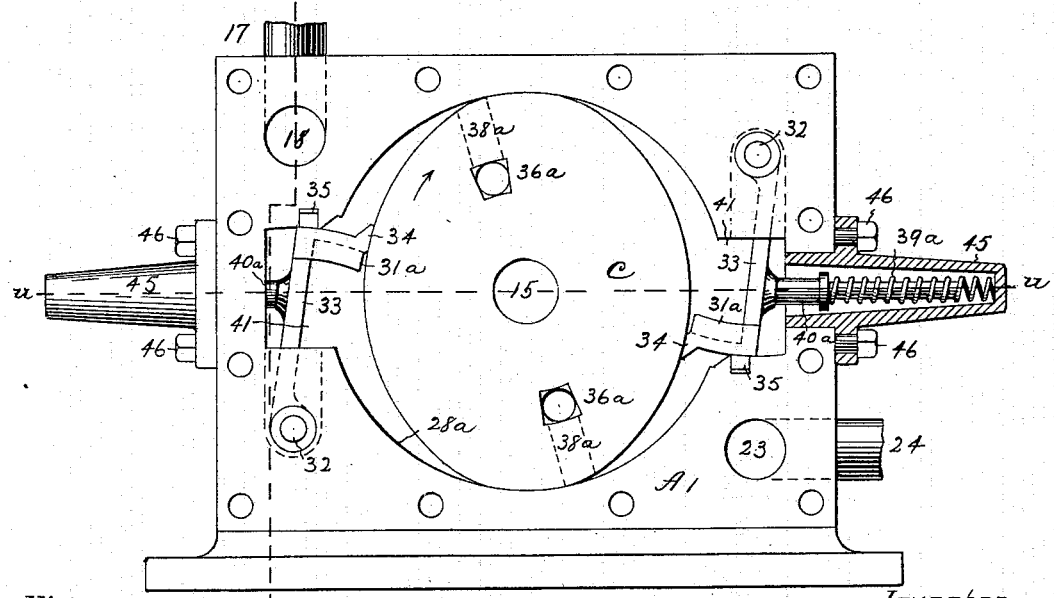
Witnesses
Inventor
Joel T. Case.
By James Shepard.
Atty.

No. 612,191. Patented Oct. 11, 1898.
J. T. CASE.
ROTARY ENGINE.
(Application filed May 19, 1897.)
(No Model.) 4 Sheets—Sheet 3.

Witnesses
Inventor
Joel T. Case
By James Shepard
Atty.

No. 612,191. Patented Oct. 11, 1898.
J. T. CASE.
ROTARY ENGINE.
(Application filed May 19, 1897.)
(No Model.) 4 Sheets—Sheet 4.

Witnesses
A. W. Stipek
P. J. Egan

Inventor
Joel T. Case
By James Shepard.
Atty.

THE NORRIS PETERS CO., PHOTO-LITHO., WASHINGTON, D. C.

UNITED STATES PATENT OFFICE.

JOEL T. CASE, OF BRISTOL, CONNECTICUT.

ROTARY ENGINE.

SPECIFICATION forming part of Letters Patent No. 612,191, dated October 11, 1898.

Application filed May 19, 1897. Serial No. 637,223. (No model.)

*To all whom it may concern:*

Be it known that I, JOEL T. CASE, a citizen of the United States, residing at Bristol, in the county of Hartford and State of Connecticut, have invented certain new and useful Improvements in Rotary Engines, of which the following is a specification.

My invention relates to improvements in rotary engines; and the objects of my improvements are simplicity and economy in construction and efficiency in operation.

Figure 1:
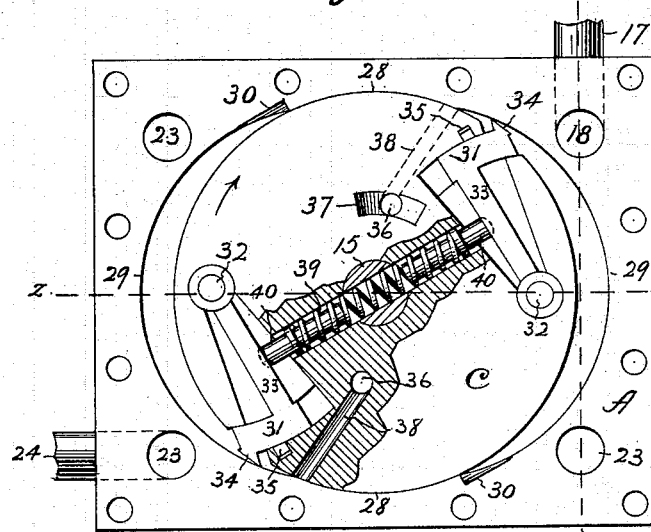
Figure 2:
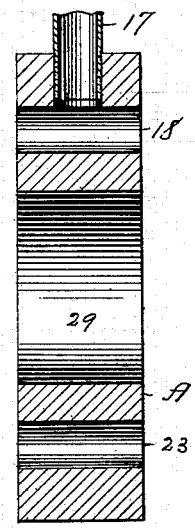
Figure 3:
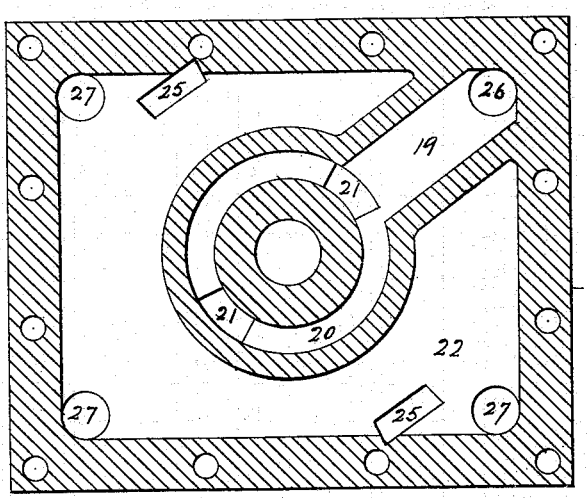
Figure 6:
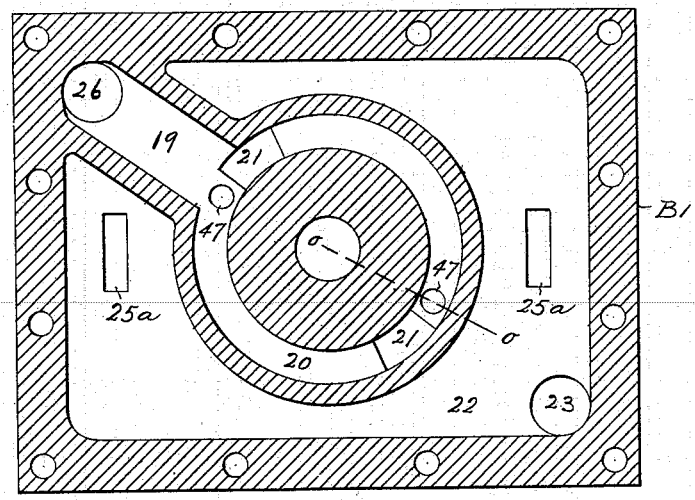
Figure 7:
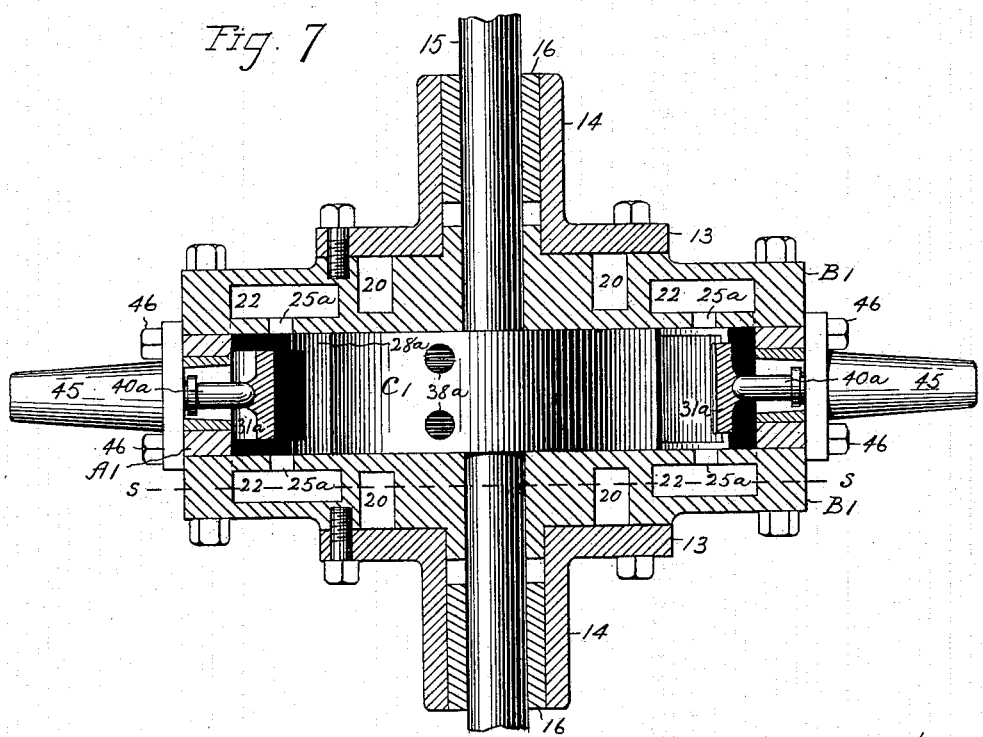
Figure 8:
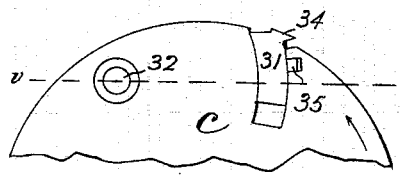
Figure 9:
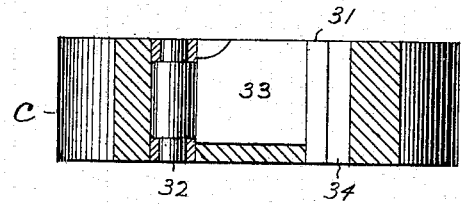
Figure 10:
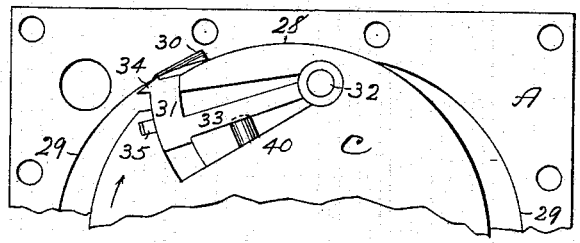
Figure 11:
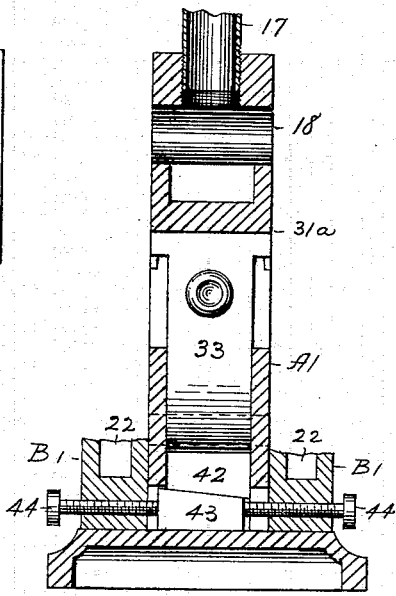
Figure 12:
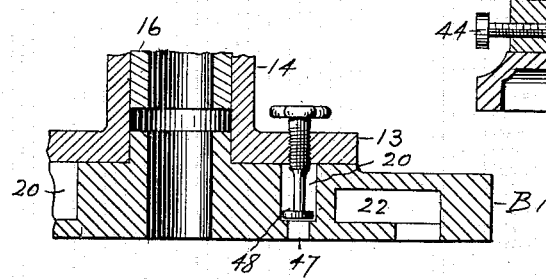

In the accompanying drawings, Figure 1 is a side elevation, partly in section, of my engine with one of the side plates removed. Fig. 2 is a vertical section of the body of the case on the line $xx$ of Fig. 1. Fig. 3 is a vertical section of one of the side plates on the line $yy$ of Fig. 4. Fig. 4 is a horizontal section of the case on the line $zz$ of Fig. 1, with a plan view of the shaft and wheel or rotary head. Fig. 5 is a side elevation, partly in section, of my engine in a different form with one of the side plates removed. Fig. 6 is a vertical section of one of the side plates of the case on the line $ss$ of Fig. 7. Fig. 7 is a horizontal section of the same, partly in plan view, on the line $uu$ of Fig. 5. Fig. 8 is a side elevation of a portion of the wheel or rotary head shown in Fig. 1, but showing the opposite side thereof. Fig. 9 is a horizontal sectional plan of the same on the line $vv$ of Fig. 9. Fig. 10 is a partial side elevation of the wheel and case corresponding with Fig. 1, but showing the gate in a different position. Fig. 11 is a vertical section on the line $ww$ of the middle portion or body of the case as illustrated in Fig. 5. Fig. 12 is a sectional view, partly in elevation, of one side of the case on the line $oo$ of Fig. 6.

A designates the body or main portion of the case, upon each side of which the side plates B B are secured. Said side plates for convenience of construction are provided with separately-formed caps 13, said caps being provided with bearing-hubs 14 for the shaft 15 and may be lined with Babbitt metal 16 in any ordinary manner. The said body of the case is provided with a suitable socket for the attachment of the live-steam pipe 17, that communicates with the transverse passage 18 through said body. The said transverse passage opens at each end and registers with the hole 26 on the inner wall of the side plate and then into the diagonal passage 19 in the side plates B, which diagonal passage connects with the annular passage 20, having the ports or openings 21 at that side of said plate B which faces the wheel or rotary head C on the shaft 15. Outside of the diagonal and annular passages 19 and 20 (which constitute the live-steam chamber) is the exhaust-chamber 22 in each of the side plates B, the exhaust-chambers in the said two plates being connected by holes 27 in said side plates and the transverse passages 23 through the body of the case, one of which passages connects with the socket for the exhaust-pipe 24 in the same way as the live-steam-pipe socket connects with the transverse passage 18 in Fig. 2.

While I have shown three of the transverse passages 23 and registering holes 27 for the purpose of symmetry and, perhaps, to more closely connect the exhaust-chambers 22 in the two side plates, the only essential one of said passages is that which connects with the exhaust-pipe 24. The exhaust-chambers are also provided with the ports or passages 25, that open to the inner faces of the side plates B.

The body of the case is chambered out to receive the wheel or rotary head C, the wall of said chamber on diametrically opposite sides being circular and concentric, as at 28, and fitted to the periphery of the wheel C. At each side of the concentric walls 28 the walls 29 of the chamber are eccentric, so as to form a crescent-shaped piston-chamber between the periphery of said wheel and the wall 29, on each side thereof, as best shown in Fig. 1. At that end of the crescent-shaped chambers which comes opposite the exhaust-ports 25 of the side plates B the corner of the case-body is beveled or chamfered off, as at 30, to provide for the ready exhaust from said crescent-shaped chamber through said ports 25 into the exhaust-chambers 22.

The wheel or rotary head is mounted on the shaft 15, is of a circular form, and of a thickness to fill the chamber in the body of the case and closely fit the inner face of the side plates B, as shown in Fig. 4. The wheel or rotary head is also provided with two swinging gates 31, diametrically opposite each other and oscillating on the pins 32 within suitable recesses in said head. The gates proper or body of the gates are segments of a circle and are connected with their pivotal end by a shank 33, which extends in the same general direction as the periphery of the wheel. They are of a length equal to the thickness of the wheel or head C and have at their outer edge a projecting lip 34, whose outer face bears against the walls of the chamber in the case. They are so mounted on their axis as to receive the pressure upon their convex face, from which the lip projects, and in such relation to their axis that said pressure is mainly thrown lengthwise of the shank directly on or toward said axis. A spring packing-shoe 35 of any ordinary construction can be placed in the wheel to bear against their pressure-face and prevent leakage. The wheel or head is drilled transversely on diametrically opposite sides at a proper distance from the axis to register with the annular steam-chambers 20 and ports 21 in the side plates, and said holes 36 are beveled off and enlarged at each end, as at 37, Fig. 1. Any number of holes 38 can be drilled from the periphery of the wheel to the transverse holes 36, so as to open to the periphery a little back of the gates 31, as shown by full lines in the sectional portion of Fig. 1 and as indicated by the broken lines in the upper portion of Fig. 1. The gates 31 are also provided with springs to press them outwardly against the case. As shown in Fig. 1, I have bored a hole through the head and its shaft between the said gates and inserted a single spring 39 therein, with plungers 40 bearing on the shanks of the gate with a constant tendency to force them outwardly.

When the wheel or rotary head is in the position represented in Fig. 1, live steam passes from the annular passage 20 through the ports 21 into the transverse hole 36 of the wheel and out through the hole or holes 38 to the periphery of said wheel, so as to deliver steam into the first end of both of the crescent-shaped chambers which the gates have just entered. Only the toe of the lip 34 now engages the wall 29. The gates act as pistons, while the wheel and this first end of the crescent-shaped chambers act as abutments to rotate the said wheel. In addition to driving the piston or gates around the steam under the lip 34 has a tendency to keep the gates in close contact with the wall of the crescent-shaped chambers until the said gates nearly reach the last end of said chambers. By this time the changed position of the gates relatively to the curved eccentric wall 29 of the crescent-shaped chambers brings the heel of the lip to bear against said wall, while the toe of said lip is slightly separated therefrom, so that the steam now entering on the outer side of said lip, which has a greater area than its inner side, has a tendency to force the gates inwardly again, as illustrated in Fig. 10. The last end of the crescent-shaped chambers is continually open to the exhaust, which passes out through the ports 25 into the exhaust-chambers 22 and is discharged through the exhaust-pipe 24. When the holes 36 and 37 pass the inlet-ports 21 of the case, the steam is cut off, and the wheel is then driven by the expansive force of the steam.

Although I have first shown and described the wheel having the gates mounted within it, as in Fig. 1, so that the gates act as pistons, I prefer on some accounts to mount the gates in the case, as shown in Fig. 5, so that they act as the abutments and the wheel acts as the pistons, and the construction shown in said Figs. 5, 6, 7, 11, and 12 is selected as the one upon which I base my specific claims. In this construction the body A' of the case is of the same general construction and is provided with like sockets for the live-steam pipe 17 and exhaust-pipe 24 and transverse passages 18 and 23, connected therewith. It is also chambered to receive the wheel or rotary head C'; but the wall $28^a$ of said chamber is wholly circular, excepting where it is recessed for the gates $31^a$. The side plates B' are of the same general construction with the same caps 13, hub 14, and Babbitt-metal lining 16 for the shaft 15, and also the same live-steam hole 26, diagonal passage 19, and annular passage 20 with ports 21 and exhaust-chambers 22 with ports $25^a$, arranged to open into the recess 41 of the case-body on the concave side of the gates 31. Said gates are provided with shanks 33 and lip 34, as in the construction first described, and are hung on pins 32, only they are hung to the case-body instead of being hung to the wheel, and the lip of the gate bears on the periphery of the wheel instead of on the walls of the case; but in both cases said lip bears on the curved eccentric wall of the diametrically opposite crescent-shaped chambers. If desired in order to take up the wear at the pivotal end of the gates, an adjustable shoe 42 may be placed back of the knuckle ends of the gate-shank, said shoe being milled or bored to fit said knuckle end and a wedge 43, placed under said shoe, which can be moved in either direction to force said shoe toward the knuckle end of the gate by screws 44 in the side plates B', as illustrated in Fig. 11, and thereby make the convex side of the gate properly fit the case. The swinging gates are forced toward the wheel by the springs $39^a$ and plungers $40^a$, the same being mounted in detachable spring-pockets 45, secured by screws 46 to the outside of the body of the case, whereby said springs are always accessible for repairs without taking the engine apart.

The wheel or rotary head C' is oval instead of round, and thus in connection with the round chamber in the case there are two crescent-shaped chambers on opposite sides of the wheel the same as in the construction first described. The wheel is also provided with like transverse holes $36^a$, chamfered or beveled at each end, which holes are connected by holes $38^a$, Fig. 7, (also as indicated by broken lines in Fig. 5,) that lead to the periphery of the wheel. It should be noted that this oval wheel has its ends or longest diameter concentric with and fitting the wall of the cylindrical chamber for a considerable distance and that the junction of the sides and ends of the wheel meet by gradual curves without any abrupt angular corner on either the front or rear. This feature is important, as it gives the advantage of always keeping the gates against the wheel even when running at a very high speed, avoids all rattling or thumping of the gates against the wheel, and enables the engine to be run at a much greater speed than could an engine of a similar construction with abrupt or angular corners on any portion of the periphery of the wheel.

If desired, additional inlet-ports 47, Fig. 6, may be formed in the side plates leading from the live-steam chamber 20 to enable the wheel to take steam for a larger part of its travel than by the ports 21, and the side plates are also provided with a valve, as at 48, Fig. 12, so as to open or close said ports, as may be desired. Of course if it was always desired to supply steam to the wheel during a longer time than the ports 21 will supply it the same could be accomplished by elongating said ports. I have arranged said ports 21 to cut off the steam at such time as to utilize the expansive force thereof and economize in steam; but the additional valved ports are provided so that greater power may be obtained when power is more important than economy in the use of steam. It is of course evident that this feature is applicable to both of the constructions shown.

The holes 36ª in the wheel and the ports 21 are so related as to let steam to the periphery of the wheel on diametrically opposite sides as the greater diameter of the wheel passes the lip 34 of the gates. The gates then act as a resisting wall or abutment, so that the steam confined in the first end of the crescent-shaped chambers acts to drive the wheel and also by entering outside of the lip to keep the gates in contact with the periphery of said wheel. At first only the toe of the lip is in contact with the wheel, as in the construction first described, and this forcing of the gate against the wheel at this part of its rotation acts indirectly to drive the wheel. As soon as the holes 36ª pass the ports 21 the wheel is driven by the expansive force of the steam. The exhaust-ports on the concave sides of the gates are always open. In this construction the crescent-shaped chambers, so to speak, travel around with the wheel. As the smaller diameter of the wheel passes the gates and brings the last end of the crescent-shaped chambers to the gates the heel only of the lip 34 bears on the wheel, so that steam enters between said wheel and lip and assists in forcing the gates inwardly, as in the construction first described. In fact, as soon as the shorter diameter of the wheel is opposite the gates the face of the lip substantially matches the face of the wheel, and from that point it gradually opens by separating its toe from the wheel to admit steam on both sides of the lip to practically balance the gate during its inward movement and during the time that a great pressure of the gate on the wheel would have a tendency to resist the forward movement of the wheel. The bearing-face of the lip is a little longer than its inner face. In other words, the heel of the lip extends a little back of the convex face of the gates. So long as the face of the gates properly fits the wheel no steam can enter the face side of the lip until after the smaller diameter of the wheel has passed said lip. In case the lip becomes worn and its face is rounded off, so as to present a convex face to the periphery of the wheel, steam may enter between the lip and the wheel when the lesser diameter of the wheel is moving toward the gates; but even then the greater area on the bearing side of the face of the lip will not be wholly presented to the steam until after the lesser diameter of the wheel passes the gates, so that the operation is substantially the same when the gates have become worn that it is when they are new and in the form shown.

In both of the constructions shown this balancing of the gates on their inward movement is attained and in both the gates are forced to their work with the greatest pressure at a time when said pressure will assist in driving the wheel, and they are balanced and relieved from their greatest pressure at a time when excessive pressure would retard the movement of the wheel. In both constructions the wheel or rotary head is perfectly balanced and relieved from all side pressure in its bearing, as the same pressure is always brought to bear on diametrically opposite sides of the wheel. Inasmuch as the two side plates with their live-steam chambers let in the steam on the opposite broad sides of the wheel the said wheel is also balanced and relieved from all pressure in the longitudinal direction of its shaft.

Having shown my engine in two different forms, it will be observed that I do not wish to confine myself to details of construction nor to the arrangement of the parts. One of the main features of my invention is the gates with the lip in combination with other parts. Another is the balancing of the wheel, and it is evident that these features are or may be the same in many different arrangements whether the gates act as pistons or as abutments. I desire to cover all such changes as may fairly fall within the spirit and scope of my invention.

I claim as my invention—

1. The combination of a case having a cylindrical chamber, an oval wheel with curved sides and ends, the ends or longest diameter being concentric with and fitting the wall of said cylindrical chamber and the said sides and ends meeting each other by gradual curves without any abrupt angular corner and swinging gates mounted in the case on diametrically opposite sides, said gates having pressure-faces directly opposite their pivotal ends and bearing-faces standing at substantially right angles to said pressure-faces for acting on the periphery of said oval wheel and curved for their whole length in substantial conformity to the wall, against which they bear, substantially as described.

2. The combination of a case and a wheel with the body of the case chambered out to receive said wheel and with it form two crescent-shaped chambers on diametrically opposite sides, and two swinging gates having pressure-faces at their ends and bearing-lips projecting from said pressure-faces, the bearing-faces of said lips extending also back of said end pressure-faces, all combined substantially as described so that the said bearing-faces of the said lips shall stand practically parallel to and bear squarely against the wall of the crescent-shaped chamber against which they bear when near the middle portion of said chamber.

3. The combination of a chambered case with the side plates of the chamber, both of which plates have the live-steam chamber 20 and a pair of diametrically opposite ports 21, a wheel inclosed within said chamber and having on both broad sides a pair of diametrically opposite ports or passages that register with the pair of ports 21 in the confronting side plates and lead through to the periphery of said wheel on diametrically opposite sides, and a pair of swinging gates on diametrically opposite sides of the periphery of said wheel, all substantially as described whereby the wheel is at all times balanced both diametrically and axially.

4. The combination of a case having a circular wheel-chamber, a wheel of an oval form with its larger diameter filling said case and dividing it into two diametrically opposite crescent-shaped chambers, the swinging gates mounted in said case and bearing upon the periphery of said wheel at diametrically opposite sides, the side plates of the case both having the live-steam chamber and ports 21, the said wheel having ports or passages that register with the ports 21 at the sides of the wheel and lead through to the periphery for admitting steam from the ports in both side plates of the wheel to one side of said swinging gates, and suitable exhaust-ports leading from the opposite side of said swinging gates, substantially as described.

5. The combination of a chambered casing and wheel with the side plates having the live-steam ports 21, arranged to register with passages in the sides of the wheel and leading to its piston-chambers, of the valved ports 47, by the side of the ports 21 substantially as described.

6. The combination with a chambered case and wheel with the swinging gates having the pressure-face opposite their pivotal end, the shoe 42 upon which said pivotal end bears, and means for adjusting said shoe toward said pivotal end, substantially as described.

7. The combination of a case and wheel with the body of the case chambered out to receive said wheel and with it form two crescent-shaped chambers on diametrically opposite sides, suitable inlet and exhaust passages, and two swinging gates having pressure-faces opposite their pivotal ends and bearing-lips projecting from said pressure-faces with the bearing-faces of said lips adapted to rock from toe to heel for simultaneously forcing both of the diametrically opposite gates to their work with the greatest pressure at a time when said pressure will assist in driving the wheel and simultaneously balancing and relieving both gates from their greatest pressure at a time when excessive pressure would retard the movement of the wheel, substantially as described.

JOEL T. CASE.

Witnesses:
JAMES SHEPARD,
A. W. STIPEK.